United States Patent
Hollowbush et al.

(10) Patent No.: US 7,567,256 B2
(45) Date of Patent: Jul. 28, 2009

(54) METHOD AND APPARATUS FOR ANALYZING DIGITAL VIDEO USING MULTI-FORMAT DISPLAY

(75) Inventors: Richard R. Hollowbush, Fleetwood, PA (US); Joseph Deschamp, Limerick, PA (US); David R. Guerrero, Center Valley, PA (US); Randy A. Mauger, Douglassville, PA (US); Robert C. Zwiebel, Coopersburg, PA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/814,401

(22) Filed: Mar. 31, 2004

(65) Prior Publication Data

US 2005/0219267 A1    Oct. 6, 2005

(51) Int. Cl.
- G09G 5/00    (2006.01)
- G06F 3/048   (2006.01)
- G06F 17/00   (2006.01)

(52) U.S. Cl. .................. 345/618; 715/243; 715/246; 715/259; 715/789; 715/792

(58) Field of Classification Search .............. 345/618; 700/243, 246, 253, 789, 792
See application file for complete search history.

(56) References Cited

U.S. PATENT DOCUMENTS

| | | | |
|---|---|---|---|
| 5,166,791 A | | 11/1992 | Crawford |
| 5,187,776 A | * | 2/1993 | Yanker ................ 715/800 |
| 5,440,683 A | * | 8/1995 | Nally et al. ............ 345/558 |
| 5,469,188 A | * | 11/1995 | Krishnamurthy et al. .... 345/618 |
| 5,546,528 A | * | 8/1996 | Johnston .............. 715/807 |
| 5,610,653 A | * | 3/1997 | Abecassis .............. 348/170 |
| 5,742,521 A | * | 4/1998 | Ellenby et al. ........... 702/127 |
| 5,870,091 A | * | 2/1999 | Lazarony et al. ......... 715/804 |
| 5,880,722 A | * | 3/1999 | Brewer et al. ........... 715/723 |
| 6,069,607 A | | 5/2000 | Everett et al. |
| 6,525,746 B1 | * | 2/2003 | Lau et al. .............. 715/725 |
| 6,532,024 B1 | | 3/2003 | Everett et al. |
| 6,721,446 B1 | * | 4/2004 | Wilensky et al. ......... 382/162 |
| 2003/0090504 A1 | * | 5/2003 | Brook et al. ............ 345/716 |
| 2003/0091329 A1 | * | 5/2003 | Nakata et al. ............ 386/52 |
| 2003/0142209 A1 | * | 7/2003 | Yamazaki et al. ......... 348/143 |
| 2004/0031030 A1 | * | 2/2004 | Kidder et al. ........... 717/172 |
| 2004/0031061 A1 | * | 2/2004 | McCalla et al. .......... 725/135 |
| 2004/0170312 A1 | * | 9/2004 | Soenksen .............. 382/133 |

* cited by examiner

*Primary Examiner*—Ulka Chauhan
*Assistant Examiner*—Jeffrey J Chow
(74) *Attorney, Agent, or Firm*—Duane Morris LLP

(57) ABSTRACT

A multi-format display device for video production and testing selectively presents a video input signal in three or more distinct ways to facilitate analysis. A complete picture, a picture zoom an area of particular scrutiny around a cursor position, tabular pixel information, a color swatch corresponding to pixel data values and graphic plots of picture data, audio and other information can be placed in areas of a formatted display. Predetermined or input pixel selection criteria can shift the display at least temporarily to identify pixels in the display that meet the criteria as the input video signal frames proceed.

12 Claims, 4 Drawing Sheets

METHOD AND APPARATUS FOR ANALYZING DIGITAL VIDEO USING MULTI-FORMAT DISPLAY

FIELD OF THE INVENTION

The invention relates to test equipment apparatus and methods for use in analyzing digital image data. The data can represent successive frames in a live or recorded video program and frames, portions of frames and individual pixels can be captured and presented.

PRIOR ART

Certain known video test devices are capable of generating several different sorts of test images, and can present one of plural selectable test images on a display screen, or two or more of a set of selectable test images, at the same time.

A simultaneous display may include a video picture image presented in a window area less than the full area of the screen, and a simultaneously displayed graph of information that relates to the same video picture. For example, a reduced-size image of the picture may be presented in one quadrant, while simultaneously showing in another quadrant a graph of composite video signal voltage amplitude versus time, thus plotting amplitude over a horizontal line in the video picture raster. Alternatively, a vectorscope polar display (saturation versus hue phase angle), can be displayed together with the picture data that the vectorscope display represents. Other simultaneous data presentations are also possible. Instead of display in quadrants, it is also possible to overlay displays, such as by superimposing a graph on top of the picture image that the graph represents.

Such apparatus are useful in part because the display presents the same video picture in two different formats that can be compared and consulted for different sorts of information. The display might contain two different graphic presentations, such as a plot of composite amplitude versus time and a plot of saturation versus hue angle. It can be helpful if the picture itself is presented as one of the formats, i.e., the picture appearing together with one or more graphic plots of data derived from the signal used to generate the picture.

In some situations, it may be desirable simultaneously to display two or more unrelated pictures, for example when preparing to switch an output from one video source to another. As another possibility, a picture display may be displayed simultaneously with information that is related to the program but not specifically to the picture, for example by providing a graphic plot of audio data together with a picture.

The present invention relates to particular techniques for displaying alternative types of data on a digital picture. Examples of arrangements with simultaneous video-related graphic and picture displays are disclosed in U.S. Pat. Nos. 5,166,791—Crawford; 6,069,607—Everett et al.; and 6,532,024—Everett et al., which are hereby incorporated.

In the Crawford '791 patent, a picture is stored and by sampling is read back out synchronously with a portion of an analog raster display, thereby re-sizing the image and placing the image only on a selected part of the full raster frame. The remainder of the picture area is available for other display information, particularly including a graphic presentation of data from the picture, such as a composite amplitude versus time plot from a selected horizontal line that can be highlighted on the re-sized picture display. The Everett '607 and '024 patents teach generating a digital pixel image of the picture, which can be displayed selectively. One or more picture images and any graphic plots can be displayed in a particular area of a display screen by writing pixel data into a corresponding part of an image memory and generating the display from the image memory. The image data can be captured, stored, processed and displayed using standard computer processors, display drivers and displays, or using more customized but similarly equipped apparatus.

It is advantageous to process image data digitally because various computational and image processing steps are conveniently accomplished on numeric pixel data. If a video signal is available in an analog form such as composite video, it is possible to sample the signal or a decoded version of the signal. Samples at regular intervals can provide numeric values of luminance/saturation/hue (or another color-space encoded set of values) for an array of discrete minimum-sized points in the picture, known as pixels (or "picture elements"). This collection of pixel data is a digital version of the picture, comprising an array of minimum area squares or dot-like spaces that each occupy a position adjacent to other spaces and together make up the picture.

Pixel data encodes three values for each pixel, three values being needed to specify a unique color state. The values for a pixel can be converted from one digital or numeric color space format to another. The data can be used to generate a larger number of pixels by interpolation, i.e., by inserting additional values between values in the array. Likewise, the number of pixels can be reduced, for example by replacing the value of two or more adjacent pixels with an average or other derived value. The data can be converted back into a composite or analog format. It can be mathematically processed and manipulated by data processors and/or other circuits. The digital data can also be transmitted, stored, compressed, subdivided, threshold detected or otherwise analyzed, and generally used in any number of different ways. Among other uses, the data can be used to generate a new signal to be displayed, wherein the previous signal may occupy a discrete window such as a quadrant of a picture screen.

Digitizing by repetitively sampling a signal value and providing a succession of data values inherently produces a set of pixel values. There are particular standards usefully applied to digitizing picture data, for representing digital video during distribution and processing. One type of standard employs digital values for luminance (Y) and color difference (Cb and Cr). There are other similar sets of three values that can be used to define the color, such as the respective amplitudes of the R, B and G color components, or values of luminance, saturation and hue, etc. There are well known equations for converting values in one color space to values in another color space. Conversions between color spaces are common. For example, luminance and color difference might be an advantageous format in which to transmit and store data values efficiently. However, R, B and G are useful when referring to drive signals in the particular color portions of a circuit.

A standard distribution format for YCbCr luminance and color difference data takes advantage of the fact that human perception is more acute as to luminance than color. The known 4:2:2 sampling and transmission format uses a sampling technique wherein the successive samples alternate between color difference Cb and color difference Cr, but each sample has a luminance value. In that way, there are twice as many luminance samples as there are values of either Cb or Cr. Stated another way, the luminance values can change twice as quickly as the color values. The samples alternate: Y1-Cb1 . . . Y2-Cr1 . . . Y3-Cb2 . . . Y4-Cr2, and so forth. It is necessary to have a value for each of Y, Cb and Cr to characterize a color state. Therefore, each discrete pixel position in the picture needs to draw part of its data from two samples. Nevertheless, both the idea of a pixel and the idea of a video data sample refer to the minimum encoded or displayed version of the picture, even though a sample and a pixel may not always correspond to one another in an exact technical sense.

In various situations, it is advantageous for test equipment used in video production to be sensitive to different aspects of a picture or a picture signal. Some important objectives for a test equipment manufacturer include making test apparatus highly versatile so that there are many ways that video data can be presented for analysis. It is also important to make the apparatus convenient, so that the operator can readily change the presentation of video data from one configuration to another.

It would require an extensive discussion to address all the ways that a user of a video test apparatus might advantageously use the apparatus to analyze a video signal. Some of the approaches might relate to aspects of the content of the video and how the image data was collected. There can be issues respecting encoding for transmission and decoding, such as errors that arise in compression, transmission, and color space conversions. There are issues as to correct synchronization and timing. There may be conditions in which an output device is out of adjustment and produces a visible anomaly but the underlying data is legal and should not produce such an anomaly. An advantageous video test apparatus should be applicable to checking and analyzing video in all of these situations.

On the data collection side, it is possible, for example, that isolated pixels in a picture are erroneous or out of range. It would be advantageous to facilitate analysis of selected pixel positions in a display so as to allow the spatial area of the error to be viewed. A challenge is presented to provide a test apparatus that allows attention to be placed on a small area within a larger picture, that does not detract from the ability to monitor the larger picture.

Errors sometimes are fleeting. In a video signal that is changing many times per second, an error in a particular frame can be difficult to find. It would be advantageous to facilitate analysis at particular moments in time. A challenge is also presented to permit attention to be focused on an instant in time, even while the video signal may be advancing rapidly from frame to frame.

Errors or other subjects of analysis may present numeric issues or visual issues. Due to the particular conversions between color space definitions, for example, it is possible for a three-variable color definition to be a legal color state within accepted limits in an original color space, but when numerically converted to a second color space to produce values that are out of range for at least one of the variables in such second color space. An out-of-range set of three values in a color space is known as a gamut error. It would be advantageous to provide a test apparatus that has good facility to deal with numeric data and with visual data.

SUMMARY OF THE INVENTION

An object of the invention is to mediate the foregoing conflicting interests in a digital video test apparatus. That is, the invention advantageously serves important interests in versatility versus convenience, focus on spatial detail versus a larger view, time capture versus flow, and numeric versus visual presentations. Preferably, this is accomplished using digital data processing, display driver and display presentation apparatus with certain automatic and certain user selection modes, including the selection of particular outputs to be presented at a given time. The result is a device that is versatile, convenient and highly useful in video production environments and the like.

A multi-format display device for video production and testing is provided that generates and selectively maps into an output at least three distinct presentations. These presentations can be located selectively at different areas of a display, made relatively larger or smaller, selected individually or in pairs or trios, etc., so as to facilitate analysis of video data for discrete areas within the video picture or for specific technical aspects of the picture or picture signal. Advantageously, the user can selectively devote the full display apparatus to one presentation, or present two related or unrelated presentations along side one another, or present several presentations at the same time, each preferably representing a distinct way in which the picture, and/or the underlying picture data, are viewable for analysis. These distinct ways include the full picture, preferably with a movable cursor pointing to a selected area, a zoomed area around a chosen area (pointed out using the cursor or selected by another technique such as threshold selection criteria), and a tabular numeric analysis of the samples. Advantageously, the tabular numeric display includes swatches demonstrating the visible results the sample values for one or more pixels and/or samples at the position of a cursor shown in the complete picture and in the zoomed area.

A video processor and a controller responsive to user input selections display the complete picture from the input signal on a limited part of the device display area, such as a quadrant of a digitally controlled standard display. The complete picture can be a resized version of the data contained in the complete picture, adjusted mathematically to reduce the spatial resolution, or adjusted by sampling the pixels and/or sample values as necessary to cause the full image area to occupy such limited part of the display device.

Selectively, preferably using another limited part mapped into the display area, a picture zoom is presented. The picture zoom area shows a visual enlargement of a subpart of the picture at and around a cursor position. The controller and the video processor can operate automatically and/or in accordance with user input to select one or more cursor positions. For example, a cursor position can be selected automatically to show the area at and adjacent to an illegal pixel or sample value, a color gamut violation, a specific data value, etc.

The zoom area is preferably large enough that individual pixels or data samples are made readily visible as blocks, due to the visual enlargement of the data contained either in the original input signal or in the resized version of the complete picture that is displayed in the first limited part of the display area discussed above. The zoom area also shows the cursor or otherwise identifies particular pixels that are subjected to scrutiny. The picture pixel or sample data is mapped into blocks of pixels in the display device output.

The video processor and controller generate and selectively present a tabular form of specific pixel numeric data for one or more pixels at the cursor, for example by mapping this presentation into another part of the display screen or permitting user selection of this presentation in lieu of (or in addition to) the other available displays. One or more of the optional selections preferably contains the full picture, the picture zoom limited to an area of scrutiny around the cursor, and a tabular data presentation wherein a color swatch is shown in a color state corresponding to the pixel data values. Furthermore, these optional selections can be shown individually or in groups of two or more, mapped to all or to a discrete part of the output display area by operation of the video processor and controller.

Graphic plots of picture data, audio, time code, and other associated information can be placed selectively in remaining areas or shown by default. The controller and video processor are operable to accept pixel selection criteria, to identify pixels in the display that meet the criteria, and to scrutinize the selected pixels in sequence, subject to manual selection override.

BRIEF DESCRIPTION OF THE DRAWINGS

A number of additional objects and aspects are apparent from the appended description and the associated illustrations of preferred embodiments, wherein.

DETAILED DESCRIPTION

Figure 1:
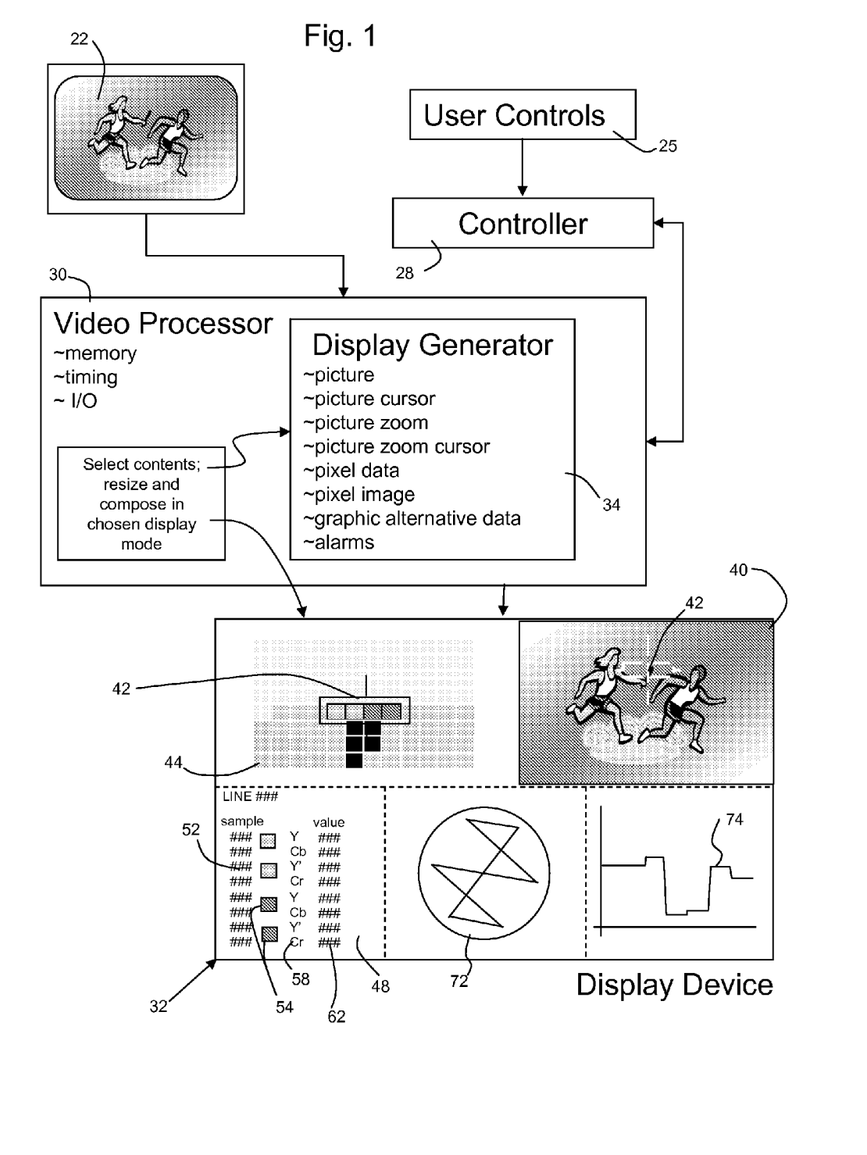
FIG. 1 is a block diagram showing the primary functional elements of a multi-format display according to the invention for analysis of digital or pixel images.

Referring to the block diagram in FIG. 1, a multi-format display device and associated method are shown, particularly for application to video production and test uses. The device and method are arranged to facilitate the analysis of a stored or active (e.g., live) video signal, using different information display formats at different areas of a display. According to the invention these areas display a version of the incoming video input signal, a relocatable zoom area from the video input signal, associated with a cursor position, a tabular information display showing digital sample values that contributed to the video at the cursor as well as corresponding color swatches, and can further include certain graphic plots representing time, amplitude, and color-space value plots that demonstrate aspects of the video input signal.

In FIG. 1, the video input signal 22 is represented by an image box. The invention is applicable to a digital video signal, but the video input signal 22 can be supplied initially as a digital progression of sample values, or can be digitized by a conventional analog/digital converter (not shown), that can be included as an element of the test apparatus. Similarly, the video input signal 22 can be derived from stored information such as a compressed video data, decrypted data, etc. In any event, the incoming video input signal 22 is provided in or converted to a digital format supplied to or generated in the device.

The digital values of the incoming signal can be in any of various forms, of which several conventional forms are known. Thus, the samples can be carried in a parallel or serial communication path. The incoming signal and the digitized samples can assume or be converted among any of various formats, including custom or standardized formats such as according to NTSC, PAL, CCIT, SMPTE, HDTV, etc. The signals can be conventional serial digital interface (SDI) signals as used in broadcasting applications or developed by decoding or decompressing stored data files such as MPEG data or the like. The invention is generally applicable to these and other such variations, wherein at some point in the processing of the video signal, a digitized version of the signal is available or can be generated by the test device itself.

In addition to the video input signal 22, signals developed from user controls 25 and handled by a controller 28 are coupled to a video processor 30 that generally comprises input/output circuits, a memory sufficient to store digital data representing all or part of the incoming video input signal 22, and a display generator section that produces from the video input signal 22 and signals such as switch settings from the user controls 25, a formatted display 32, on a display device. In the example, shown in FIG. 1, the formatted display 32 comprises several discrete zones of a single integral display field, and is produced by a display generator 34 associated with the video processor 30.

The formatted display 32 can be produced in several ways, including coupling the video processor 30 and display generator 34 to generate separate and different displays on different display devices. However according to the preferred embodiment shown, the display generator 34 is arranged to allot separate zones in the display area of a single display device to represent several different display format types. This preferably is accomplished by the display generator 34 composing a pixel image of values for the formatted display 32 that can be read out through a standard digital monitor device. For example, the display generator 34 can provide frame data for a digital display driver operable to produce a VGA, XVGA or other standard format display, or can drive a display device, e.g., by producing RGB signals, composite signals to be decoded, or otherwise to encode display information to be converted into a visual presentation at another point along a signal path, e.g., by a remote device.

In the preferred arrangement, the formatted display 32 is shown on a single digital display device and the display generator 34 produces a multi-format image by composing a frame of pixel data values to be displayed. The composed data to be displayed can be a single frame that demonstrates aspects of the video input signal 22 at a point in time such as a single frame or field. Preferably in at least some modes of operation, the display is composed repetitively, being thereby actively changing in response to changes in the character of the video input signal 22.

The apparatus including the video processor 30 incorporates or is coupled to at least one device operable to present the formatted display 32 of information at least partly from the video input signal. For this purpose, the apparatus includes a controller 28 that can be coupled to or between the video processor 30 and to at least one control input 25 by which certain control selections are made, preferably by a user who manipulates the controls to change the display from time to time. The controller is operable to control a nature of the information displayed by the video processor in various ways, including selectively to display information regarding the video input signal in alternative ways, to selectively position a cursor for pointing to an area of the display to be subjected to analysis, to select certain graphic plots and to enter data that will be used in composing the particulars of the display.

The video processor 30 is operable to produce, on at least part of an area of the display device, a visual display that corresponds to the span of the full picture 40 of the input video signal. As shown in FIG. 1, a frame of the full picture is placed in a limited area of the full formatted display 32, namely in an upper quadrant in the example shown. The full display area of the formatted display 32 preferably is presented on a display or monitor device that is at least capable of displaying a picture to the maximum resolution expected in the input video signal over the full area of the screen. In other words, the display is capable of producing a number of distinct horizontal lines each comprising a row of laterally spaced pixels, such that the incoming picture comprises a given number of horizontal lines of which each line has a given number of lateral pixels or samples. The number of total pixels is the product of said given numbers. In order to display the same picture information on this display device, for example in one quarter of the area of the full screen, it may be necessary either to attend to a change in resolution, or perhaps to employ a difference in timing or sampling.

According to one embodiment, the video input signal 22 can contain a raster scan of horizontal lines. In that case, a stream of digital samples can be provided to represent the changing pixel color values across each successive line (luminance and color difference YCbCr or color component amplitude RBG, or luminance-saturation-hue, YUV, etc.). The samples can be received in analog composite or component format in the incoming signal or can be digitized from composite or component signals such that the sampling rate defines each minimum increment or pixel as one sample value. Alternatively, the video input signal 22 can be previously digitized and supplied serially or in a serial/parallel stream or as a data file, that contains or is decoded to provide an array that encompasses a given number of pixels. In order to present the full incoming picture contained in the video input signal 22 in one quarter of the display, the signal can be stored and read out to correspond to portions of the overall display.

There are several ways in which resizing can be accomplished. For example, if the output display device used to display the formatted display 32 as an output frame has a resolution that is high enough, e.g., at least four times the resolution of the incoming picture, then all the pixel values in the incoming picture can be read out into the area corresponding to the quadrant or other portion in which the full picture 40 is to be represented in the output. Usually, however, incoming picture signals such as the picture contained in video input signal 22 are encoded and decoded at a resolution that is comparable to the maximum resolution of the display device, so as to take full advantage of the possible detail and picture quality.

In the event that the formatted display 32 is composed of a pixel field and the incoming video input signal 22 is composed of a pixel field, then the full field of incoming pixels can be mapped spatially to the pixels in the quadrant where the full picture 40 is displayed. This will normally involve converting the number of pixels in the video input signal 22 to the number in used for the quadrant in the output. For example, assuming equal total resolution (i.e., the same counts of pixels in length and width encoded in the digital input and provided by the output device), the output signal can be a decimated version of the input signal wherein for a one-quadrant presentation, one of four pixels in each horizontal line is used and every fourth vertical line is used, these pixels mapping into one quadrant of the output display. (A different proportion can be used if the output is to occupy some proportion other than one fourth of the available display field.)

Rather than decimating, the pixel values can be processed mathematically. For example, every four adjacent pixels in the input signal can be averaged as to their color defining variable values, and the average used as a pixel value in a one fourth sized field, namely a quadrant of the area of the display device. This amounts to reducing the pixel-by-pixel resolution of the video input signal 22 in order to present it in a reduced area of a display having a resolution equal to the resolution of the original input signal. Of course, there are other possibilities. For example, if the input signal has a coarser resolution (a smaller number of total pixels) than the display device, then less decimation or mathematical averaging may be necessary.

The matter of pixels and sampling is analogous to the amplitude of a composite signal that is scanned in an interlaced or non-interlaced raster pattern in an analog sense. For such a display, every other field of an interlaced signal could be stored line-by-line and read out during scanning of the quadrant area shown.

In a hybrid arrangement, it is further possible to receive incoming video input signal 22 in digital form, to convert the digital data to an analog signal, and to resample the analog signal thus obtained to provide pixel sample data that can be processed as described, namely displayed in a limited area, such as one quadrant, of the multi-format display output.

In a preferred embodiment, the video input signal 22 is a serial digital signal having a bit rate or resolution equal to the full resolution of which the display device is capable. The incoming pixel data values are mathematically processed in a running average and decimated to reduce the number of pixels to a number that maps into the output display quadrant.

The foregoing mapping of the complete input signal into a limited area of the output display field is only part of the composition of the output display field. However, this aspect causes the full signal to be represented in the display of the test apparatus of the invention, in close proximity to other display portions that are arranged to apply or concentrate analysis and attention on specific portions and/or aspects of the signal.

According to another aspect of the invention, a specific spatial portion of the compete signal can be identified with a cursor 42. The cursor is movably positioned by means of the user controls 25 and/or by operation of the controller 28. The cursor is generated by the video processor and is superimposed on the signal represented in the area of the full picture 40 of the output formatted display 32.

According to a further aspect of the invention, an area 44 of the picture contained in the video input signal 22 is zoomed or enlarged and placed in a first supplemental display area that preferably is another part of the display area available in the formatted display 32. This picture zoom area 44, shown in the upper left quadrant in the formatted display 32 of FIG. 1, is used to display only the subset of the complete picture that is located at and adjacent to the cursor 42. The area used for this portion of the input signal can be displayed on an area that is of comparable size to the area used for the full picture 40 in a quadrant of the area of the formatted display 32, but in any event the area shown is substantially enlarged.

It would be possible to display the picture zoom area 44 in a first supplemental display area at a resolution that is equal to a resolution that would be obtained by displaying the video input signal 22 in the full area of the output formatted display 32, which would be an enlarged display relative to the complete picture 40 displayed in the first area, namely the quadrant shown. Preferably, however, the picture zoom area 44 is displayed at an even larger relative size (i.e., a lower or coarser resolution) so that individual pixels are readily distinguishable as blocks or swatches of one color state each, as shown in FIG. 1.

The picture zoom area occupying the first supplemental display area is part of the display that is composed by the video processor 30 from the video input signal 22. The video processor maps pixels that are at cursor 42 to a block of pixels in picture zoom area 44 of the formatted display 32.

The cursor 42 identifies one or more pixels or data samples in the image defined by the input signal. It is possible to include in the manual controls a capability to select a cursor size, such as a single pixel or two or more adjacent pixels in a line or as appearing adjacent to one another is successive lines, or in another arrangement in which the pixels are adjacent or otherwise are related. A nominal cursor size is four adjacent pixels in one horizontal line.

The zoomed picture portion that is used by the video processor in mapping an area of the input signal to the supplemental display area is changeable in position in the display field (location in the picture) and optionally in size or shape. One or more of these aspects is determined by settings via switch inputs or data supplied to the controller 28, and at least the location of the cursor in the picture is determined in this way. The position can be a manual or automatic selection. Using manual selection, the user typically sets and displays the zoom image from one cursor location and thereafter moves the cursor to a different location and locally zoomed area. It is possible to permit the cursor location to be held in a memory and to set a new position while retaining the previous location in memory, with a capability to revert to a previous position or to retain the data relative to the previous position.

The zoomed picture can have a preset number of pixels or can have a varying number of pixels. The varying number of pixels can be displayed in a preset portion of the area of the formatted display 32 (i.e., in a preset vertical-horizontal span). Alternatively, the relative sizes of the respective windows for the full picture 40 and the zoomed picture in picture zoom area 44 can be variable such that enlarging one can reduce or encroach on the space for the other. These changes are readily provided because as a matter of mapping, the video processor 30 and controller 28 operate in conjunction to compose the output image according to user controls 25 and/or automatic criteria, and by inserting data into a display memory that is then read out to present the output display. The mapping by the video processor 30 can include pixel data from the image as described, pixel data at different or alternatively selectable locations and resolutions, as well as graphic elements.

The pixels encompassed by cursor 42 potentially have different color states. Further, the pixels are generally the product of sampling that involves quantifying the respective values applicable to the pixels in a color space, i.e., at least three variable values to define a color state. According to an inventive aspect, at least a second supplemental display area under the composition control of the video processor 30, which again is preferably a subdivided part of the same area of the formatted display 32, is populated by the video processor with a tabular data report showing the video data characteristics at a limited area identified using the cursor and constitutes a pixel information area 48.

According to another aspect, the multi-format output produced by the apparatus of the invention, preferably as composed by the video processor and controller 30, contains a report of the color space variable data. This report as shown in FIG. 1 can include information that numerically defines the cursor location by the horizontal line and serial sample numbers of the pixel(s) encompassed by the cursor, and also includes the values of the color space variables.

In a preferred embodiment, the serial digital video data can include sub-sampled chroma information wherein each pixel corresponds to a sample value. Each sample of the video can have an associated luminance value Y and color difference value Cb or Cr. In standard 4:2:2 video, each color difference value has an associated luminance value, such that the luminance value can change from one sample to another but only one color difference value can change with each new sample. As a result, it is useful to determine the resulting color. According to the invention, a color swatch 54 is associated with each sample or pixel, the color swatch having the same color as shown in the picture zoom area 44, but shown in the pixel information area as a separate block that is associated with the numeric value of each of the luminance and new color difference value that is new to the associated sample.

It is possible to display the numeric color difference values in different ways. For example, the numeric values can be stated in the YCb-Y'Cr sequence shown or in another sampling sequence or set of color space variables. The numeric values can be in decimal, hexadecimal, binary, etc. A new color swatch can be displayed for each new value of Y or Cb or Cr, instead of once per new sample containing a pair (either YCb or YCr).

The preferred tabular report in pixel information area 48 of the invention includes a sample number 52, a sample color swatch 54, and sample values shown by both a name designation 58 of the variable (Y, Cb, Y', Cr) and its numeric value 62.

The apparatus of the invention can be used to process a video input embodied by a full rate video source in which the program changes from moment to moment. The image that is produced and displayed by the video processor preferably varies in real time with the changing picture. In an actively changing video input signal, the changing frames can cause the data displayed to change quickly, so among the manual controls it is possible to set a cycling rate whereby there is some dwell in that the display only changes at a predetermined rate, regularly sampling at least one picture frame but not changing with every new frame that is received. Alternatively, the frame shown can be arranged to be a freeze frame that is selected by manual operation of a user control 25, e.g., operating a pushbutton switch or operating other inputs that cause the device to freeze and display a frame at a particular time or upon the occurrence of particular conditions such as the occurrence of predetermined data values or other conditions in the sample data.

In order to meet the data processing requirements needed to resize and locate the full picture 40, apply the cursor 42 at the required location, generate the zoom presentation in picture zoom area 44 and also produce the tabular display at pixel information area 48, it is possible to employ a processor, but preferably some of the functions are served by using dedicated digital networks such as field programmable gate arrays to serve one or more of the display composition and presentation functions. For the most part, these functions involve processing the incoming picture of video input signal 22 and loading values into a display memory to produce the resized, zoomed and tabular versions of the input signal.

In the embodiment shown in FIG. 1, there are additional graphic presentations made. The specific graphs shown, namely a vectorscope or polar plot 72 of color saturation as a function of hue phase angle, and a plot 74 such as the signal amplitude (which may corresponds to luminance, for example) over a horizontal line, can be conventional plots, for example wherein the vectorscope plot 72 presents the saturation/hue relationship over the entire picture. Alternatively, the vectorscope plot 72 and/or the composite amplitude plot 74 can be made specific to the area of scrutiny shown in the picture zoom area 44. Furthermore, the video processor 30 can be switched between modes in which such plots are applicable to the whole picture (or whole horizontal line) or are applicable only to the zoom area.

Such operations can be accomplished within the video processor and controller, which preferably include a resizing engine operable to present the input video signal on said part of the area of the display device, the resizing engine operating by at least one of recalculating values, decimating, sampling and reading out pixel values so as to reduce a number of pixel position in the input video signal to a smaller number of pixel positions in one display area such as the area used for full picture 40 and also to zoom or enlarge the pixel values in another area such as picture zoom area 44.

As discussed above, the control inputs 25 can be used manually to operate the controller 28 so as to select from the video input signal 22 an area of particular scrutiny, among other selections as needed to switch between optional display modes. The video processor is operable simultaneously to present the video input signal 22 as a full picture 40 on one part of the area of the display device, a zoom image for placing scrutiny on a selected portion of the picture by enlargement in a supplemental display area such as picture zoom area 44, and by display of tabular data with color swatches for providing a further alternative and even more-detailed form of data for analyzing the video signal.

The location is governed by the location of the cursor 42 on the picture, and the cursor can encompass data for at least two successive points representing one of pixels and samples from such part of the area of the display device. As discussed, the location of the cursor on the picture can be determined by manual inputs. According to one aspect, the cursor position can be determined by relative movement controls such as a mouse, trackball, joystick or similar control. The cursor position could also be entered numerically as a line number and serial sample number in the line.

According to another inventive aspect, the video processor is responsive to control inputs that define selection criteria whereby one or more locations are selected as a function of the video data values corresponding to the location. The controller 28 in conjunction with the video processor 30 automatically selects from the input video signal at least one area of particular scrutiny, and automatically selects a cursor position, based upon data in the video signal meeting the selection criteria. However, this function of automatic selection also is arranged to accommodate manual selections.

Figure 2:
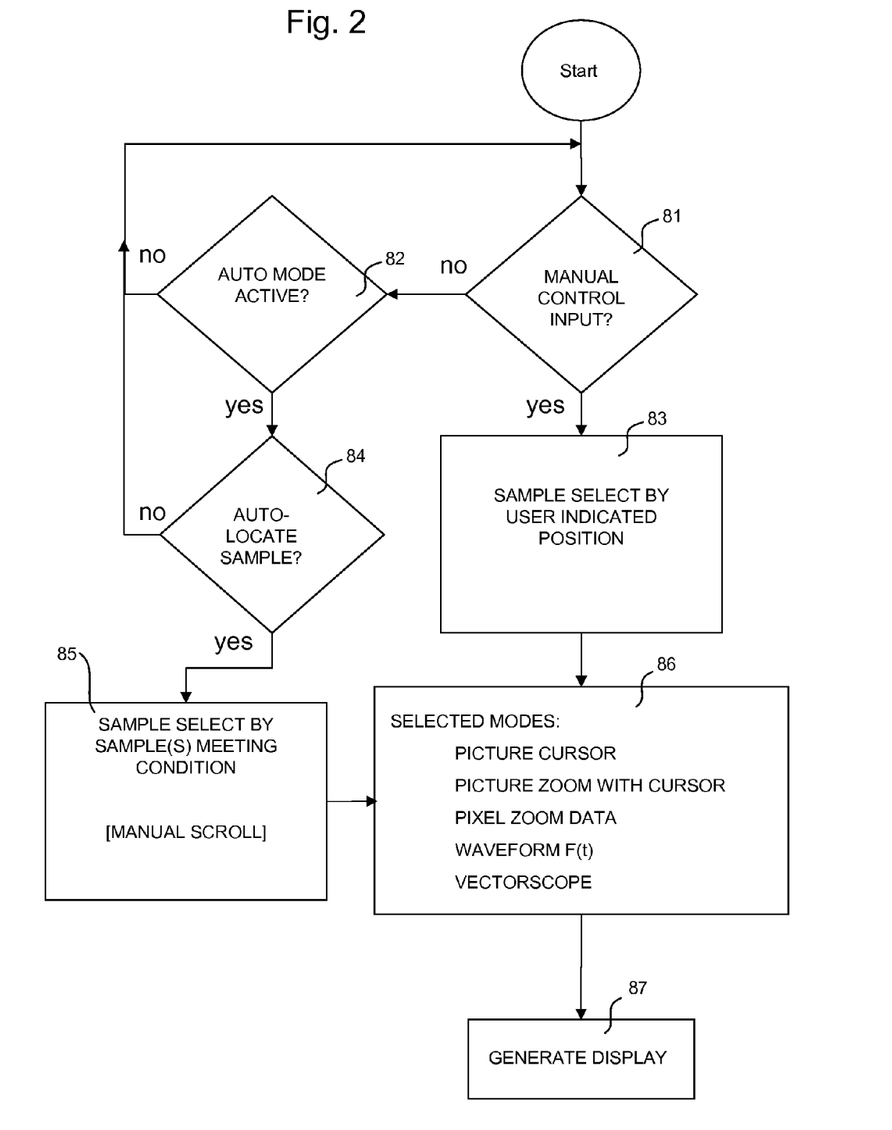
FIG. 2 is flowchart showing steps involved in mediation between automatic and manual selection of display areas to be subjected to scrutiny.

The controller and the video processor need to coordinate between automatic and manual selection of the area for particular scrutiny. This coordination is shown in FIG. 2, which is a flowchart in which the decision triangles branch between automatic and manual selection of one or more cursor positions. The manual selection can supersede automatic selection while active. The manual selection can supersede automatic selection for a limited period of time. The manual selection can selectively determine which one of a plurality of cursor positions is to be active. Certain selectable positions can be determined automatically as a function of pixels at the corresponding locations meeting selection criteria. Other selectable positions can be manual selections. Furthermore, the selection criteria preferably can be adjusted by manual control inputs, for example changing selection threshold values or the like.

The loop in FIG. 2 can be executed for each display field to be processed. The entry point branches at decision block 81 based on whether a current manual control input is received. When no manual input is active, the flowchart proceeds to block 82 and tests for whether the automatic mode is active. If there is no manual input and the mode is not auto, the flowchart loops. If a manual control is input, block 81 causes the manual location selection to supersede automatic selection. In that case, at block 83, the cursor location selected manually is entered for obtaining the picture zoom and pixel tabular data is location.

If auto mode is active (decision block 82), it is possible that no particular sample has been selected at auto-locate decision block 84, in which case the flowchart loops as if not in auto mode. According to an inventive aspect, however, selection criteria can be entered that cause the location(s) of one or more pixels that meet such criteria to be assumed as the selected cursor location automatically. In that case, block 85 selects the sample location(s).

Whether the cursor location to be used is entered manually or results from automatic selection, block 86 provides for one or more of several alternative or simultaneous display fields to be presented in the display to be shown. It is possible selectively to display the complete picture alone, on the full area of the display, or to display the resized version shown in FIG. 1 and to display one or more of the other display frames together with the complete picture. In the preferred embodiment, at least certain of the display modes include the full picture 40, the zoom picture and the pixel information detail. Furthermore, the preferred formatted display also can include one or more additional data plots such as plots 72, 74 in FIG. 1. The actual plots 72, 74 shown in FIG. 1 are stylized and represent plots that might appear when the video input signal 22 contains a color bar test pattern.

Figure 3:
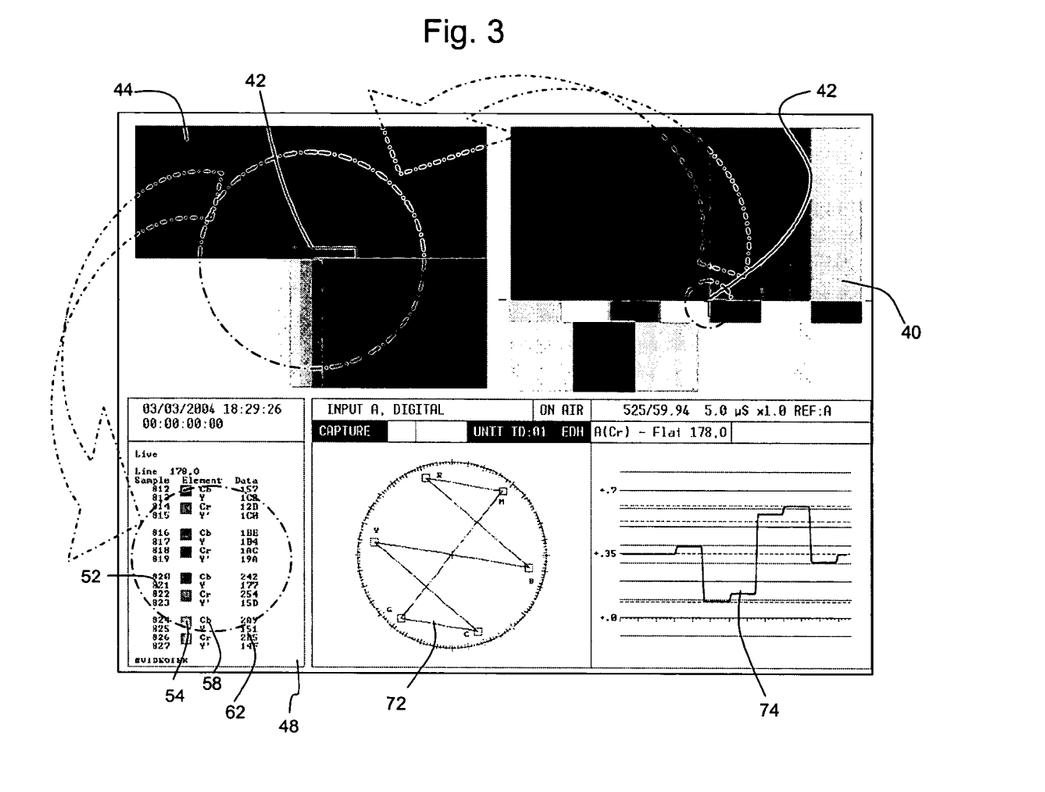
FIG. 3 is a display image capture showing the invention as used to analyze a color bar test pattern that has been re-sized.

FIG. 3 shows the invention applied fully to the depiction of a color bar test pattern, namely a progression of color bars in order of increasing luminance value. For purposes of illustration, cursor 42 is placed at a transition between colors immediately adjacent to a contrast between color states of horizontal lines that are over and under the cursor 42. As discussed, the full picture 40 is resized from a resolution that might fit the full display screen and mapped into the upper right quadrant. The cursor 42 is superimposed on the picture, in this case using a dark rectangle with vertical center lines.

As shown schematically by the arrows, the resized picture is enlarged or zoomed in the area of cursor 42, and the particular area around the cursor is displayed in picture zoom area 44. For purposes of illustration, in FIG. 3 the picture zoom in picture zoom area 44 is generated from the resized full picture 40 as opposed to being generated entirely from the incoming original picture signal (such as video input signal 22 in FIG. 1), which would also be possible. However as shown in FIG. 3, the process of resizing the image to one quarter or less of the its original resolution has produced an artifact that shows that a local averaging technique has been applied. In the embodiment shown in the example of FIG. 3, transitions in color state can be seen to progress in steps from one color bar to the next, each pixel at the transition representing a step in the change of color state from one pixel to the next in a horizontal direction. If the incoming video input signal 22 had been decimated, the transition between color bars could occur abruptly from one pixel to the next at the horizontally abutting edges of adjacent color bars, but in this case instead there is a transition showing the results of mathematically sampling, averaging or otherwise reducing the resolution in steps. The transition in several steps is clearly visible in the picture zoom area 44 in FIG. 2, but is not seen in the complete picture. This illustrates one of numerous aspects that might be of interest to an engineer or technician using the apparatus of the invention to analyze a video signal.

The picture zoom area 44 presents a detailed visual presentation of the cursor area of the full picture 40, and the pixel information area 48 presents a detailed data representation of the pixels within the cursor selection box, as shown by the phantom dash-dot arrow in FIG. 3. The number of pixels in the cursor selection box can be variable from one to several (e.g., one or four or eight, etc.) based upon user selection as entered via the user controls 25 and used by the controller 28 and video processor 30 in the generation of the display.

Figure 4:
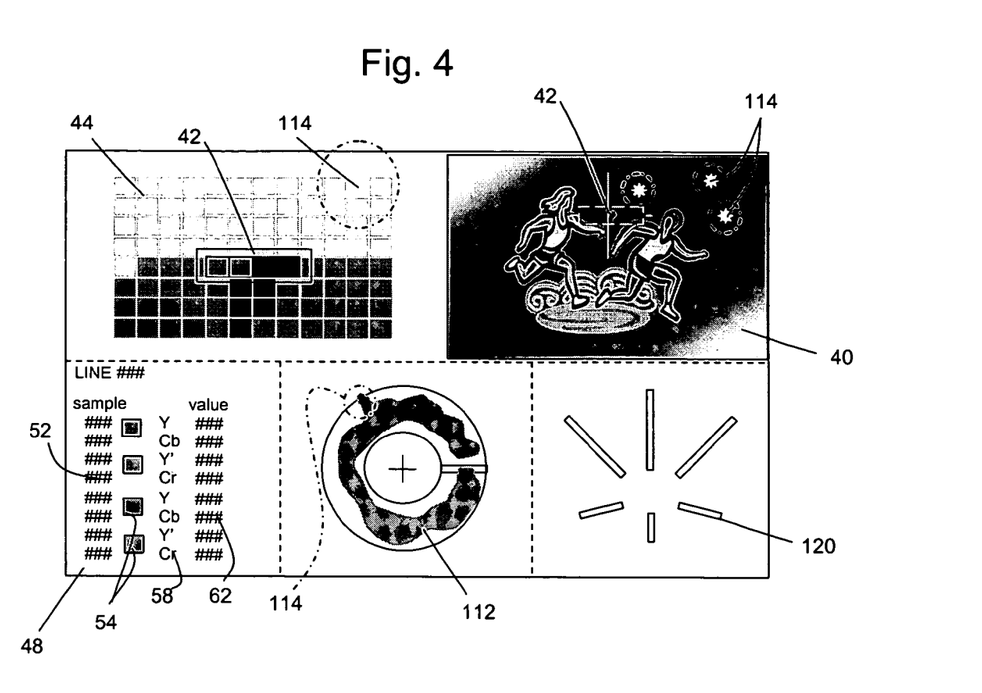
FIG. 4 is a display image substantially as shown in FIG. 1, for illustrating the automatic selection of areas for application of scrutiny, and with alternative graphic plots being selected.

FIG. 4 illustrates another advantageous aspect, namely the use of automatic selection criteria to determine one or more cursor locations, and in this case wherein a color gamut value violation is at least one of the criteria by which a location selection is made. A color gamut violation can occur, for example, when a value for one of the three applicable values in a color space definition exceeds the span of permitted values. Inasmuch as the values in different color spaces are mathematically related, it is possible and sometimes occurs that values are adopted that are legal in one color space but illegal in another. In the embodiment shown in FIG. 4, the white burst points are assumed to represent pixel values wherein at least one of the associated color space values exceeds some threshold value. The threshold value can be a predetermined value such as the maximum permitted value a value such as (but not limited to) an illegal value of luminance, color difference Cb or Cr, saturation, hue angle, R B or G amplitude, etc., that exceed the permitted maximum and minimum according to an industry standard. Alternatively, the applicable threshold can be an arbitrarily selected value that the operator chooses to monitor, to find and focus attention on pixels having one or more color space values meeting a manually entered threshold value criterion.

In the embodiment of FIG. 4, the automatically selected pixels 114 (for examples pixels that offend some threshold criteria) have associated locations, that in the automatic mode shown in FIG. 2 produce sample selections. The operator using a manual control "scroll" input (not shown) can advance from the manually selected cursor location to one of the locations of automatically selected pixels 114, thereby at least temporarily moving the cursor 42 to one of the automatically selected pixels 114, and/or advancing from one automatically selected pixel to the next. In so doing, the picture zoom display frame is changed to zoom the location of the next automatically selected pixel 114, and the associated numeric data for the new pixel is displayed in the pixel information area 48.

In this way, the video processor is operable responsive to the control input to define a selection criteria and automatically to select from the input video signal at least one area of particular scrutiny based upon data in the video signal meeting said selection criteria. The video processor simultaneously presents the input video signal on part of the area of the display device, a zoom image of an area of particular scrutiny at and around the selected area on a first supplemental display area of the formatted display 32, and a detailed analysis of the offending pixels, and preferably their immediate neighboring pixels, in the second supplemental area, these areas preferably being different areas of one integral display or presentation.

According to the embodiment shown in FIG. 4, one of the display fields is a gamut error iris plot 112. This display is substantially as disclosed in U.S. patent application Ser. No. 09/726,093, filed Nov. 29, 2000, entitled Method And Apparatus For Polar Display Of Composite And RGB Color Gamut Violation, which is hereby incorporated for its teachings of methods and apparatus for detecting and displaying gamut violations. The display is a polar plot wherein the angle represents hue, but the radius represents a combination of at least two color space values. In one embodiment, the radius is equal to the sum of the color saturation and luminance, which is the extent of excursion of the composite value, and has predetermined maximum and minimum values that are shown on the exemplary plot as radially spaced circles. Similar graphics can be used simultaneously to display R, G and B amplitudes as a function of hue, wherein the three variables likewise should plot to points within predetermined limits.

According to the invention, the selection criteria that can be selected can advantageously include a gamut error violation, and the areas of the display that are not used for progressively more detailed scrutiny of the full picture 40, the zoomed cursor area pixels in picture zoom area 44 and the cursor pixel tabular data at pixel information area 48, can include a gamut error plot 112.

FIG. 4 also shows that the plots displayed in conjunction with the picture, zoom and pixel data displays need not all be related to the video aspect of the picture. For example, the multi-format display can permit the selective display of a audio graphic 120 for showing the amplitude and or phase attributes of an audio surround sound signal embedded in the serial digital program that also includes the video programming information.

The video data characteristics displayed in the picture zoom area 44 (namely, the first supplemental area in addition to the area of the full picture 40) and the tabular pixel information area 48 (the second supplemental display area) can include sample data for at least two successive points representing one of pixels and samples from the part of the area of the display device associated with the cursor, whether manually or automatically positioned. In the embodiments shown, the samples are assumed to be within the cursor at one selected position. It is also possible to show tabular data for two or more locations in the picture, such as a number of points having gamut issues as shown in FIG. 4 (e.g., the automatically selected pixels 114 representing a gamut error, or meeting a numeric user selection criteria if not a gamut error per se). In the event that locations are selected on multiple horizontal lines, the tabular pixel information area 48 can include multiple tables, each table as shown, but the tables placed laterally along side one another in the display. Other variations in the display positioning can also be permitted, such as selecting which of the display alternatives is to be included and which alternative is to be place in which quadrant or other subdivision. It is also possible to superimpose the displays, for example superimposing the graphic plots 72, 74, 112, 120 on top of the full picture 40.

In the embodiment shown, the video data characteristics displayed in the second supplemental display area as numeric values for identifying the successive points are numeric values quantifying a video color characteristic of each of the successive points, such as 4:2:2 samples or pixels. Each point (each sample or each pixel) preferably includes a color swatch, namely a visual presentation of a zone that has the video color characteristics that correspond to the color variable data values at the sample that is also represented numerically. This aspect provides a very quick and convenient way to compare and cross reference between the complete picture cursor area, the zoomed picture area and the pixel data area, without the need to count lines or pixel positions or otherwise to pore over the displays.

As described, the invention is a multi-format monitor for video signal analysis comprising video signal analysis and processing apparatus operable to present a display having at least three distinct selectable display areas. A first of these display areas include a full visual presentation of the video signal in one of said display areas, occupying an area less than the full available area of the display. This full visual presentation at least selectably includes at least one cursor that identifies a limited part of the visual presentation containing at least one pixel defined by one of a sample value and a discrete minimum size zone.

A second of the display areas has an area zoom presentation in which the limited part associated with the cursor is zoomed in size to show a local area including and surrounding the pixel. Preferably this area is of sufficient size to readily distinguish individual pixels at the resolution and area size used.

A third of the display areas contains a pixel data zoom containing a numerical analysis applied to the pixel. In a preferred embodiment, this numeric data includes three color space variable values, although as shown by the foregoing examples it is possible and advantageous to represent the data as chroma sub-sampled data wherein there are more sampled occurrences of one variable (Y) than another (Cb, Cr).

The multi-format monitor further includes a video signal input for providing a video signal to be analyzed, the video signal including at least one of successive picture frames and fields. This input can be arranged to accept serial digital video, stored video files, analog composite or component signals to be digitized in the apparatus, etc.

A video processor is coupled to the display and is operable to produce a display of information at least partly from the video input signal for said display areas. A controller is coupled to the video processor and to at least one control input, wherein the controller is operable responsive to a user input to control selection of information displayed by the video processor, and said selection selectively includes manual selection of a position of the cursor, and automatic selection of the position of the cursor, based upon user selection criteria.

The invention likewise can be considered a method for presenting video information for analysis, for application to a video signal. As above, the signal could be represented by a stored video program, a presently processed program or another similar source. The steps involved include providing a multi-format display having a plurality of display areas; displaying the video signal as a complete picture at one of the display areas, while preferably providing a cursor for identifying a position in the picture; enlarging and displaying at a second of the display areas a portion of the picture representing a limited area at and around the position identified by the cursor forming a picture image zoom that is substantially enlarged compared to a corresponding area in the complete picture; and numerically representing at least one pixel associated with the cursor by at least one data value associated with one of a position and an appearance of said at least one pixel, and displaying a tabular presentation of the data value at a third of the display areas.

The limited area at and around the position identified by the cursor forming the picture image zoom is enlarged so as to present individual pixels as discrete blocks of the multi-format display. Furthermore, a tabular presentation that provides an alternative presentation of the visual representation of discrete blocks is provided, and preferably includes in the tabular presentation some color swatch pixel appearances that correspond to the data values shown.

The method also includes selectively controlling the cursor position that the display focuses upon of for analysis. The cursor location on the complete picture or frame can be determined manually or automatically or by a combination of manual and automatic inputs. A user control input permits entering of at least one of a manually selected cursor position on the picture and at least one manually defined data selection criterion. After moving the position if necessary or filtering through the picture pixel data for occurrences that meet the criteria, the manually selected cursor position and/or filtered pixel cursor positions are selectively displayed. That is, concurrently or selectively these cursor positions are marked, zoomed and used to populate the pixel information tabular displays and swatches. In the complete picture, one cursor position or two or more cursor positions can be pointed out and focused upon by presentation in the tabular data, preferably being shown and marked on at least one of the complete picture and the picture zoom, by highlighting, graphics, target-like graphic forms, etc. for identifying the currently selected cursor position.

The method of the invention can also include graphically displaying, for example at a fourth of the display areas, at least one variable or plot that is associated with a data selection criteria by which the automatically selected cursor position is determined. In a preferred embodiment, a gamut error type graph can be provided as the variable plot, wherein a selection criteria involving two or more variables plotted as a function of a third variable is used to plot excursions beyond a predetermined acceptable threshold level.

Preferably, each of the foregoing display areas produced by a video processor and controller composing the contents of the display frame by processing contents of an image memory, and generating the display frame from said contents. As discussed, this process operates the video processor portion in conjunction with a controller responsive to user controls, to resize the complete picture for display in a subset of the display frame, to resize a portion of the complete picture around a cursor for zoomed display that shows pixels as distinct areas, and generation of tabular data on the pixels at the cursor together with any necessary or desirable plots.

The invention having been disclosed in connection with the foregoing preferred arrangements, variations will now be apparent, and should be considered encompassed within the scope and spirit of the invention.

What is claimed is:

1. An apparatus for use in analyzing video images, comprising:
    a video input signal providing a video signal to be analyzed, the video input signal including at least one of successive picture frames and fields containing a video picture that changes in time;
    a video processor operable to produce a display of information on a display device at least partly from the video input signal, wherein the display of information comprises a repetitively composed formatted display of images that is changed over time from one mode of display of information to an other mode of display of information, as the video input signal changes in time, wherein said modes of display of the information comprise different selections of display elements, each of the different selections comprising one or more of:
        a full representation of the video picture contained in the video input signal, selectively presented so as to occupy at least a portion of a display area of the formatted display;
        a zoom image including an area of particular scrutiny in said video picture, selectively presented so as to occupy at least a portion of the display area of the formatted display;
        a report of video data characteristics of at least one point within said area of particular scrutiny;
        a subset of said full representation, said zoom image and said report; and,
    wherein a controller is coupled to the video processor and to at least one control input, wherein a user selects via the control input at least one selection criterion applied to the video signal to cause a change in the formatted display of images from said one mode to said other mode, and wherein the user selects via the control input a selection of the display elements to be included in the display composed by the video processor when the selection criterion is met.

2. The apparatus of claim 1, wherein the video processor has a display mode wherein the full representation of the video picture, the zoom image and the report of said video data characteristics are presented at different parts of the display device and present progressively smaller parts of the area of particular scrutiny.

3. The apparatus of claim 2, wherein the report includes a tabular display of data respecting pixels at the area of particular scrutiny.

4. The apparatus of claim 3, wherein the tabular display of data includes sample location information and color sample data.

5. The apparatus of claim 4, wherein the tabular display of data includes a color swatch demonstrating the color sample data.

6. The apparatus of claim 1, wherein the video input signal contains a digital video signal with successive picture frames and the video processor produces the formatted display repetitively for increments of at least one frame, from one of discrete sample data and discrete color state elements defining pixels in the video input signal.

7. The apparatus of claim 1, wherein the video processor produces the formatted display for increments of at least one frame from one of discrete sample data and discrete color state elements defining pixels in the video input signal.

8. The apparatus of claim 1, wherein the video processor is operable to resize at least part of the video picture for presentation in part of an area of the formatted display that occupies less than a full area of the formatted display, and wherein resizing by the video processor includes at least one of recalculating pixel values, sampling pixel values and reading out selected pixel values.

9. The apparatus of claim 1, wherein the control input is operable by a user manually to select from the video input signal an area to be the area of particular scrutiny, and wherein the video processor is operable simultaneously to present the video picture and the zoom image including the area of particular scrutiny, in different areas of said formatted display.

10. The apparatus of claim 1, wherein the video processor allots the formatted display to accommodate said change in the formatted display of images from said one mode to said other mode.

11. The apparatus of claim 1, wherein the controller and the video processor are operable to coordinate between automatic and manual selection of the area of particular scrutiny, wherein one of said manual selection and said automatic selection supersedes an other of said manual selection and said automatic selection for a limited period of time after said changing of the formatted display by the video processor when the selection criterion is met.

12. The apparatus of claim 11, wherein the selection criteria for said automatic selection include a color gamut value criterion having at least one threshold value such that a value meeting the threshold value criterion is selected for particular scrutiny.

* * * * *